Aug. 29, 1939.  A. G. DEAN ET AL  2,171,425
VEHICLE CONSTRUCTION
Filed Sept. 19, 1936   5 Sheets-Sheet 1
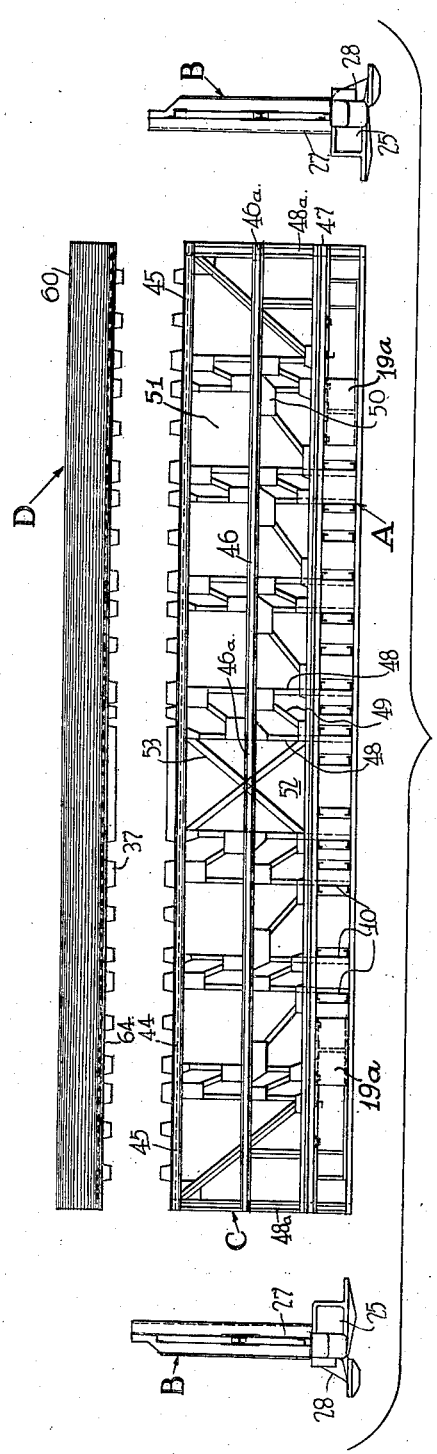
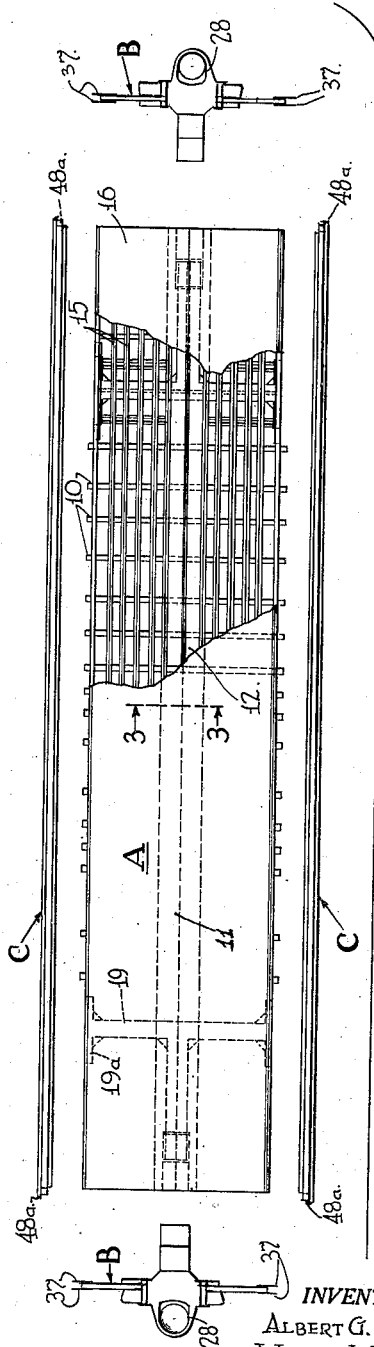
INVENTORS
ALBERT G. DEAN.
WILLIAM W. FARR.
BY
ATTORNEY.

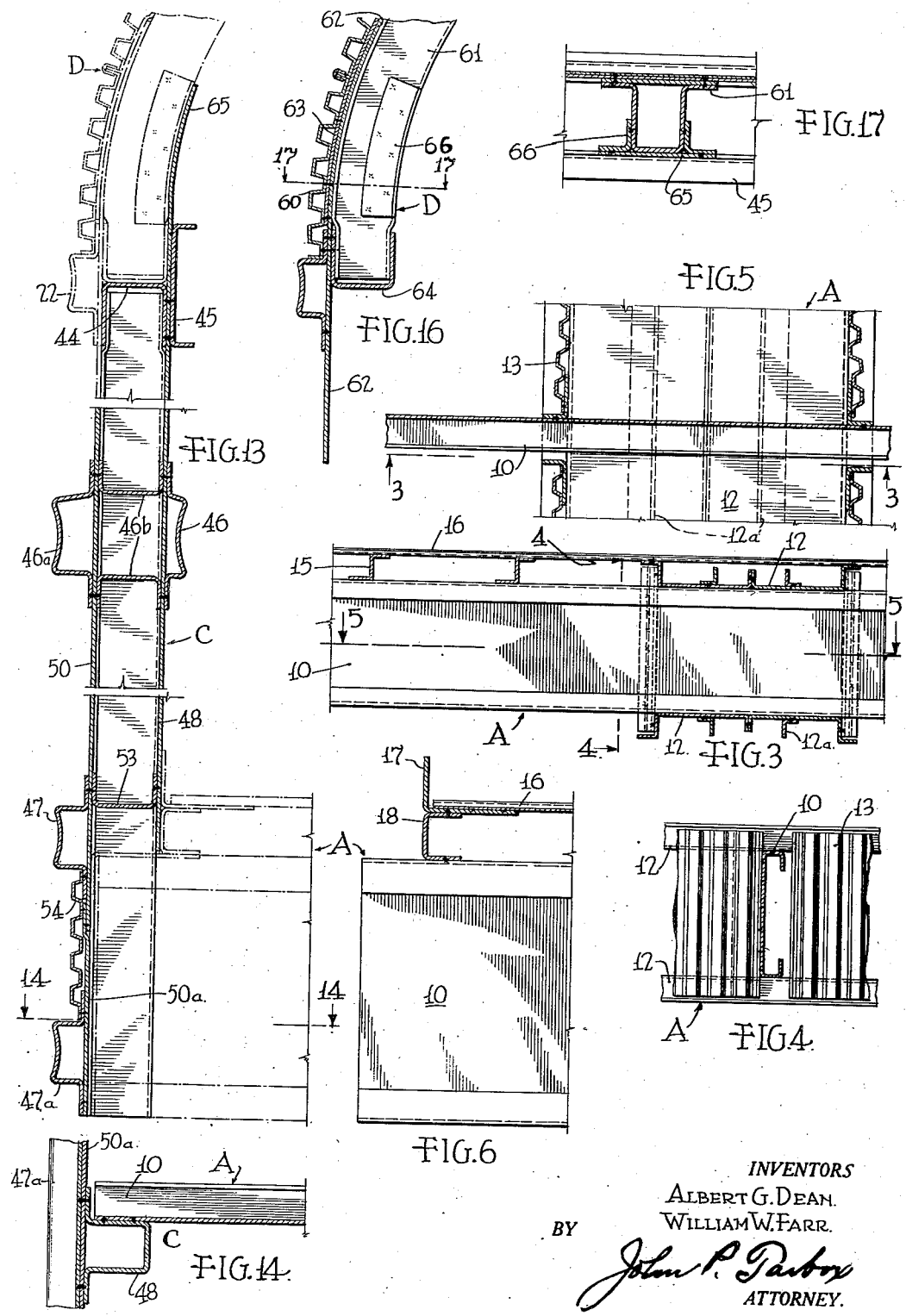

Aug. 29, 1939.  A. G. DEAN ET AL  2,171,425
VEHICLE CONSTRUCTION
Filed Sept. 19, 1936   5 Sheets-Sheet 3
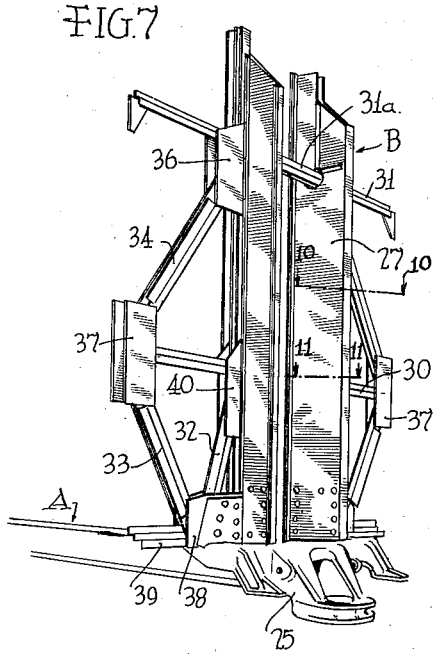
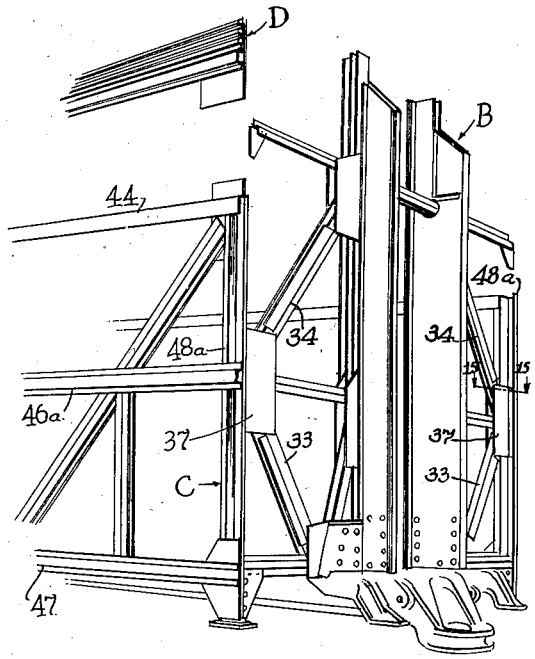
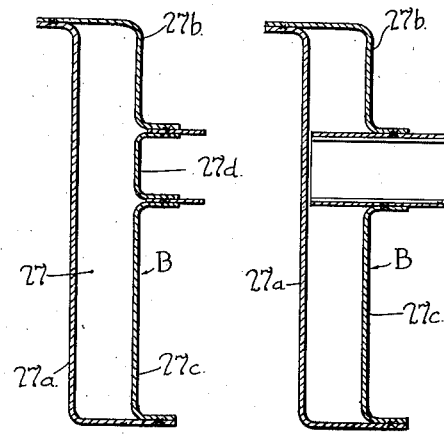
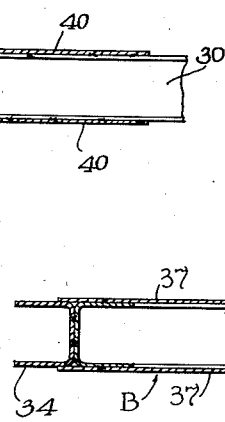
INVENTORS
ALBERT G. DEAN
WILLIAM W. FARR
BY John P. Tabor
ATTORNEY.

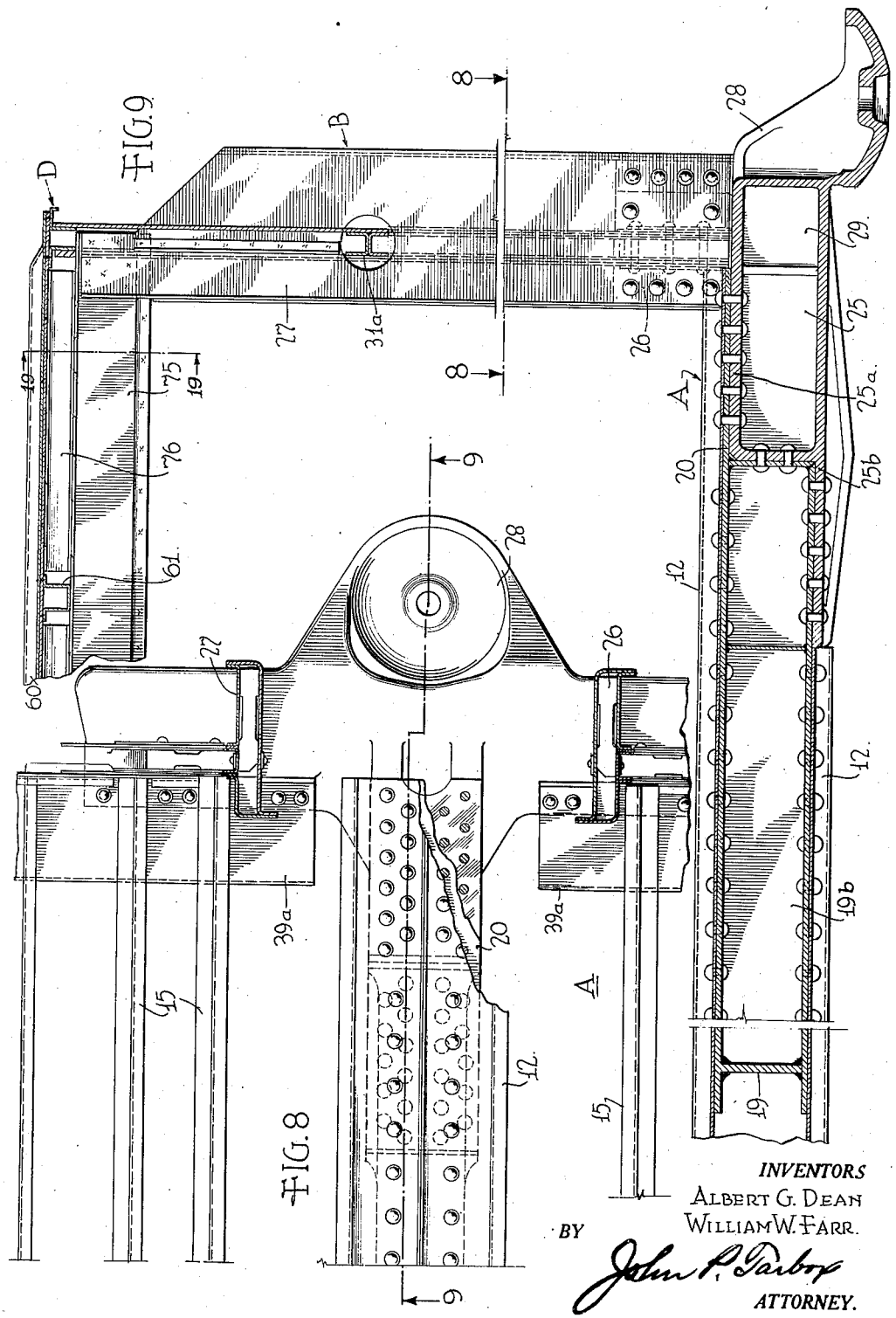

Aug. 29, 1939.    A. G. DEAN ET AL    2,171,425
VEHICLE CONSTRUCTION
Filed Sept. 19, 1936    5 Sheets-Sheet 5
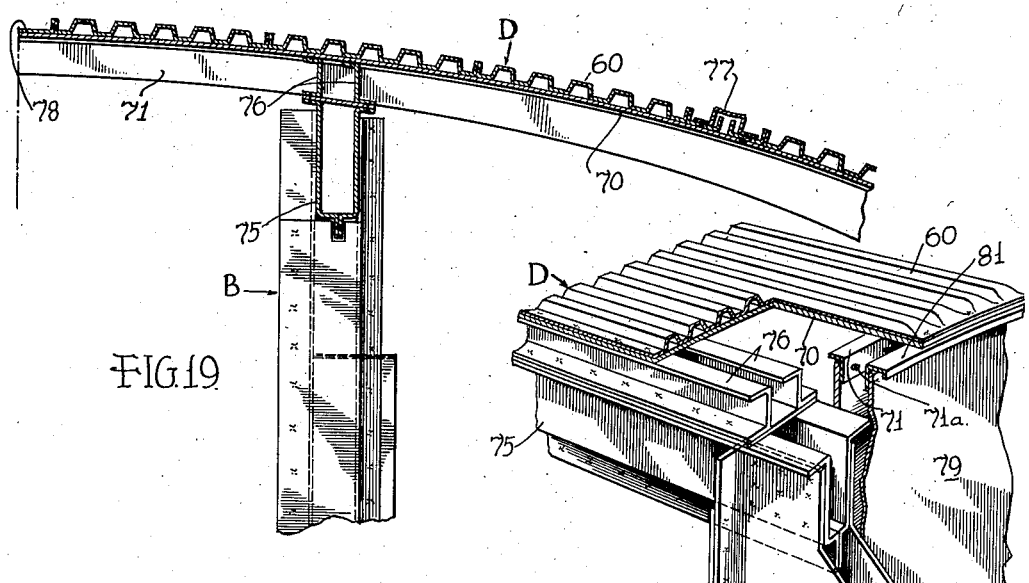
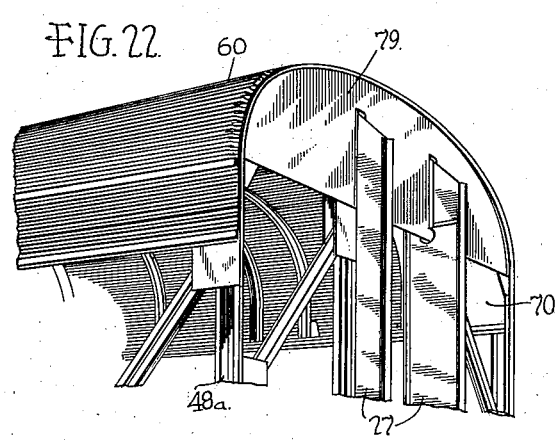
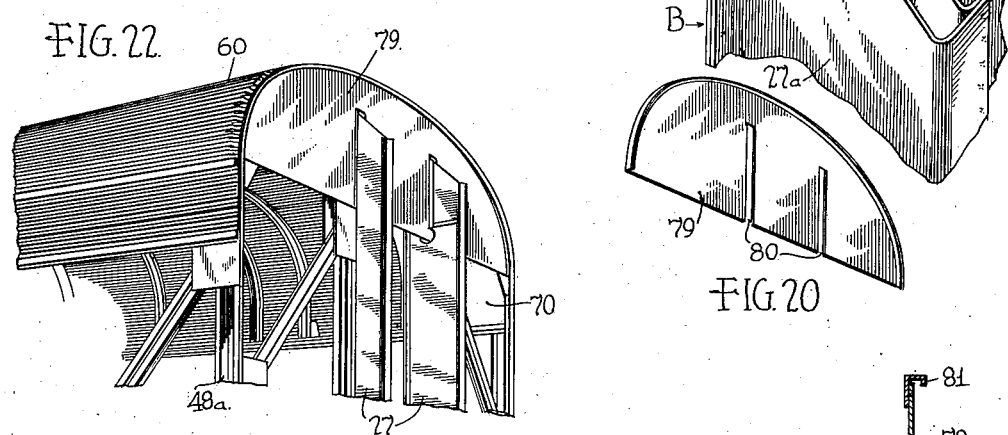
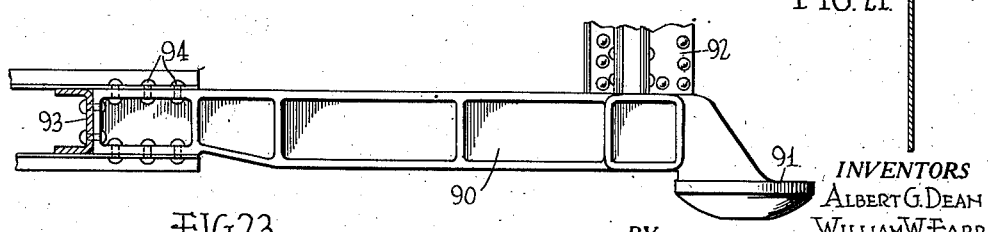
INVENTORS
ALBERT G. DEAN
WILLIAM W. FARR
BY
ATTORNEY.

Patented Aug. 29, 1939

2,171,425

UNITED STATES PATENT OFFICE 2,171,425

VEHICLE CONSTRUCTION

Albert G. Dean, Philadelphia, and William W. Farr, Penn Valley, Pa., assignors to Edward G. Budd Manufacturing Company, Philadelphia, Pa., a corporation of Pennsylvania Application September 19, 1936, Serial No. 101,668

16 Claims. (Cl. 105—399)

This invention relates to improvements in vehicle body construction and more particularly to a rail car body of light-weight hollow truss type.

Rail cars of relatively light-weight hollow truss construction, especially those of the high tensile stainless steels have proven to be successful in operation over substantial periods of time and under various operating conditions. Considerably reduced weight characteristics of such cars are due not only to the use of improved materials such as high tensil stainless steel of the "18—8" variety, but also the use of metal sections which can be efficiently stressed. With increasing demands for more nearly standardized structural equipment it is necessary not only to make a structurally sound body, but one which is readily constructed in the shop with economy of labor and uniformity of material. The present invention therefore relates to an improved structure especially adapted for welding, preferably made of "stainless" steel and especially adapted for relatively high production. It contemplates sub-assembly of the principal body units which may be finally assembled at the point of initial fabrication or at a distant point of use, and toward that end, it includes simplified cross sections of beams, posts, etc., which may be readily attached to adjacent members and by which effective stress distribution is obtained.

The principal object of this invention is to provide an improved rail car body having a high strength-weight ratio which is principally built up of relatively light gauge metal strips formed into angular cross section truss elements and integrated by welding or riveting, the elements being so fashioned and assembled that the principal structural portions of the body such as the side walls, end walls and roof may be separately formed and completed at final assembly.

A specific feature of the invention is the provision and arrangement of diagonal truss members and anchoring gussets in both the side frame sub-assembly and end-frame sub-assembly with especial reference to the corner edge so that effective welding can be obtained by simple welding tools, the diagonals of the adjacent members extending to relatively different points so as to be free for welding tools.

Another object of the invention is to provide an improved end frame construction fabricated of sheet metal units formed into deep collision beams and having an effectively continuous truss formation for transverse load distribution, the posts being relatively hollow and being anchored to strong purlines in the roof structure to facilitate final assembly and to tie in the roof as a compression resisting member.

A still further object of the invention is to provide an improved underframe construction including longitudinally and laterally extending truss members, all of which become a mutually stabilized construction serving as an effective plate girder at the underframe level upon application of floor sheets and being especially capable of resisting horizontal loads with vertical load reactions and bending moment reactions resisted by other body members more easily adapted to absorb them.

Another feature of the invention is the provision of continuous through-running truss members for a truss type side-frame sub-assembly in which the truss members are initially continuous across doorways and other large openings, to maintain rigidity pending final assembly and to permit transportation of the sub-assembly unit as may be desired or necessary. Further objects and advantages of the invention will appear from the following description thereof taken in connection with the attached drawings which illustrate one preferred form of embodiment and in which:

Fig. 1 is an exploded elevational view of a vehicle body with the near side wall of the body omitted and looking toward the assembled far side wall.

Fig. 2 is an exploded plan view of the vehicle body shown in Fig. 1 with parts of the underframe broken away and showing the relative location of the side and end wall units with respect to the underframe.

Fig. 3 is a vertical cross-section taken substantially along the line 3—3 of Fig. 5 showing details of the floor beams and center sill.

Fig. 4 is a vertical cross-section taken substantially along the line 4—4 of Fig. 3.

Fig. 5 is a horizontal cross-section taken substantially along the line 5—5 of Fig. 3.

Fig. 6 is a partial side elevation with parts in section of the end of a transverse floor beam.

Fig. 7 is a perspective view of the end frame sub-assembly showing the partial attachment to the underframe.

Fig. 8 is a horizontal section taken substantially along the line 8—8 of Fig. 9.

Fig. 9 is a vertical section taken substantially along the line 9—9 of Fig. 8.

Fig. 10 is a horizontal section taken substantially along the line 10—10 of Fig. 7.

Fig. 11 is a horizontal section along the line 11—11 of Fig. 7.

Fig. 12 is a perspective of the end and side sub-assembly units showing the manner of attachment of the roof.

Fig. 13 is a vertical section through the side frame adjacent to post.

Fig. 14 is a horizontal section substantially on the line 14—14 of Figure 13 and showing the attachment of the floor beam to the post.

Fig. 15 is a horizontal section taken substantially along the line 15—15 of Figure 12.

Fig. 16 is a vertical section through a portion of the roof adjacent a carline.

Fig. 17 is a transverse section taken substantially along the line 17—17 of Fig. 16.

Fig. 18 is a composite view in perspective of the attachment of the roof to the collision post of the end frame.

Fig. 19 is a vertical section taken substantially along the line 19—19 of Fig. 9 looking toward the end of the car.

Fig. 20 is a perspective view of the closing plate for the end frame.

Fig. 21 is a vertical section through the closing plate shown on Fig. 20.

Fig. 22 is a perspective view of the completed end of the car body, and,

Fig. 23 is a side elevation of a modified form of end sill member.

A preferred form of embodiment of the invention includes, as shown in Figs. 1 and 2, sub-assembled units including underframe A, end frame B, side frame C, and roof D. Each of these units is built on suitable jigs (not shown) with considerable independence of operations which would not otherwise be possible in the limited confines of a car body. After the separate sub-assemblies are completed the preferred manner of final assembly is to first attach the end frame to the underframe; then the side frames to the underframe and end frames; and subsequently, to apply the roof. As hereinafter described, each sub-assembly is especially provided to facilitate final assembly and primarily, to make successive welding possible so that all welding will be finished before the structure is closed. Furthermore, simplified welding tools and a reduced number of welds afford substantial reductions in labor and equipment.

The underframe sub-assembly A specifically includes transverse floor beams 10 which are preferably of C shape such as shown in Fig. 4. The vertical depth of these beams is rather great with respect to the width, such beams having an effective plate girder reaction with the deep web completed by the upper and lower flanged or channel chord portions. The floor beams are continuous from side to side of the car body and are spaced at suitable longitudinal intervals throughout the length of the car body.

Intermediate the ends of the floor beams 10, and extending longitudinally throughout the underframe, is a sheet metal, box section center sill 11, between the chords 12 of which extend the floor beams 10. These chords 12, as shown in Fig. 3 are relatively flat, being of angular cross section at the edges and in order to use narrower material, they are conveniently of two pieces, being secured together in the medial plane of the center sill. This central joint makes a straight welded unit possible and gives extra rigidity at the center. The outer flanges permit welding of the center sill webs 13 which are preferably of corrugated cross section as shown in Fig. 5. Supplementary angles 12a may be attached to the flat part of the chords 12 to reduce the flat pitch ratio if desired.

The chords 12 are welded to the floor beams 10 which extend through the center sill thus forming a rigid center sill throughout its length and also stabilizing the floor beams. The center sill becomes a highly effective column, adequate to take the maximum draft and buffing loads, with the bending moment reactions distributed into other body members more readily adapted to resist them.

Longitudinal stringers 15, conveniently of Z shape are also secured to the tops of the floor beams 10 as by welding, such stringers being transversely spaced and rigidly holding the floor beams adjacent the ends. The last two stringers 15 on each side are not welded to the floor beams until after assembly of the side frames, however, as the integral connection of the ends of the floor beams to the side frame requires some flexibility. The stringers aid materially, however, in establishing rigidity of the floor beams and this is further improved by the transversely corrugated flooring 16 which is in turn welded to the stringers. As shown in Fig. 6, an angle 17 and channel 18 serve as side edge supports of the flooring and, as hereinafter described, they also serve as an anchorage or joint between the underframe and side frame.

Near the end of the underframe, the center sill chords telescope over a needle beam member 19 the lateral extensions of which are provided with large, elongate, flange portions 19a (see Fig. 2), such flange portions being secured to the side frames as hereinafter described. The needle beam 19 is also conveniently provided with a forward extension 19b in the plane of the center sill and forming a part of the center sill in this region, this extension having an end portion of downwardly and outwardly stepped relation, the upper extension 20 and the bottom face of 19b serving to receive the stepped portions 25a and 25b of the end sill 25 as shown in Fig. 9. The stepped relation is of advantage in case the end sill is to be removed if damaged.

The underframe consisting of floor beams, center sill and needle beam is preferably set up on a jig with the subsequent assemblies added to it. If desired, the end sill may also be initially secured to the underframe or if desired, the end sill and end frame may be made into a sub-assembly unit and added to the underframe at the needle beam. With the stepped construction, either procedure may be used, although with the preferred form of end sill 90 as shown in Fig. 23, initial assembly of the end sill and needle beam 93 to the center sill chords by rivets 94 is preferred. In this preferred form, the rivets 94 are spaced a considerable distance inward of the end of the sill and at a point of low bending moment.

It will be noted that the end sills 25 and 90 shown are of the articulated end type having the outwardly projecting supports 28 and 91 respectively. Such a construction sets up a very severe loading in that a bending moment reaction of a couple at the horizontal transverse axis of the end of the car in the region of web 29 must be resisted. For this reason, heavy projections 26 anchored to the torsion resisting end sill so as to rigidly transfer this moment, are provided on the end sill over which collision beams 27 of the end frame are telescoped and some of the eccentric load reactions are distributed through them into the roof. A large part of the bending moment reaction may be distributed through the needle beam 19 into the side frames, however, the flanges 19a serving to give a general distribution of this loading. Bending moment reactions are thereby eliminated from the center sill.

The end frame sub-assembly unit B as specifically shown in Fig. 7 may be initially assembled on the end sill as heretofore mentioned or added thereto in a final assembly state. Preferably, it is separately formed and it consists of a truss or plate girder structure to tie in the ends of the car body. The principal members are the anti-collision posts 27 which are of hollow construction as shown in Figs. 10 and 11.

The principal member is a single Z 27a which is formed into a suitable box member by a secondary Z member 27b and two channels 27c and 27d, the deeper of which becomes an important anti-collision member with the smaller one acting as a filler and of depth corresponding to the diagonals of the end frame and completing the double web of the box section.

The truss construction is completed by horizontal compression member 30, horizontal tension member 31a, and diagonals 32, 33 and 34. Tension member 31a has arms 31 conveniently of Z shape extending to the sides of the car body. The tension member 31a of H shape is anchored to posts 27 by gussets 36 to which diagonals 34 are also secured. Diagonals 34 are secured on the other end by gussets 37 to compression member 30 and diagonal 33. At the bottom, gussets 38 joint diagonals 32 and 33 with the end sill extension 39. Gussets 40 join the inner end of compression member 30 with diagonal 32 to the post 27.

At the bottom of the end frame, and to complete the transverse width thereof, extensions 39 of Z shape are attached to the end sill 25, such extensions having a wide horizontal flange 39a to which the floor stringers 15 are secured. These extensions serve to continue the end sill to the side frames but are vertically flexible so that the end truss assembly serves to carry this reaction to the end of the car side frame rather than a necessarily heavy transverse beam.

The principal vertical load reactions on the end frame are through diagonals 33, gussets 37, diagonals 34 and through horizontal tension member 31a, diagonal 32 serving primarily for torsional loading due to twisting of the entire car body or lateral loads on the end sill. There is an effectively continuous transverse member between gussets 37 which are the principal attachment of the end frame to the side frame. Rigidity of the end of the car body is thus ensured.

The side frames of the car body are of load carrying truss construction, the principal elements of which are the through-running longitudinal chord elements 45, 46, and 47 which are joined by the vertical posts 48 and diagonals 49 at the gussets 50. Window openings 51 and door openings 52 are provided in the desired locations, such door openings when being of such size as to cut into the truss structure, being temporarily provided with the full length chord members and diagonals 53 until the body is fully assembled. At that time, sections 46a and 53 as shown in Fig. 1 may be removed, it being understood that the underframe has a suitable supporting truss structure in the doorway region.

The details of the side frame structure are shown in Fig. 13. An inverted U-shaped channel 44 is telescoped over posts 48 and a channel 45 is secured to the top of the side frame, projecting upward a sufficient amount to serve as an anchorage to the roof carlines to which it is subsequently welded. Below, and at the belt rail, the channel-shaped member 46, having outwardly projecting flanges becomes part of a box-shaped chord member which includes outer channel 46a and intermediate channels 46b.

The bottom rail, on the outside, consists of two channel-shaped members 47 and 47a, the upper one having a related inner channel 53 which is adjacent the angle 17 and channel 18 heretofore described with the flooring. These through-running chord members thus have considerable columnar strength and are well adapted to resist the tension at the bottom or compression loads at the top placed upon them, although each is made of light gauge material.

With the box section posts 48, care must be used in the order of attachment of parts so that the welding may be completed before the sections are closed to the welding tools. For this reason the lower channel 47a and the lower side sheathing 54 are normally omitted from the side frame until after the side frame is secured to the floor beams. Considering specifically Figs. 2 and 13, it will be seen that post 48 is covered by gussets 50 throughout substantially its entire length (see Fig. 1,) and in the region of the connection with the floor beams 10, lower gusset 50a is left off until welds are completed between the web of the floor beam 10 and the side of channel post 48 (see Fig. 14). After these welds are completed, the lower channel 47a and sheathing 54 can be effectively welded to the post flanges and the flange of channel 47 by suitable tools extending around the top or bottom of the panel. The remainder of the side sheathing is subsequently bolted on for detachability.

The side frame attachment to the underframe is by means of the floor beam connections. In additions, the side frame is secured to the end frame by welding of the gussets 37 to the end post 48a of the side frame. The gussets 37 for this reason are placed at a position on the end frame that does not conflict with the gussets 50 on the side frame. One of the most satisfactory arrangements is as shown in Fig. 12 in which the gussets 37 are intermediate the top and bottom rails at which points diagonals and gussets of the side frames are concentrated. The welding of the adjacent sub-assemblies may thus be expedited with both sets of gussets open to welding tools from the end.

The roof unit D shown in Fig. 1 is also preferably a sub-assembly as it can be built on a jig on the floor and operations conveniently made without recourse to scaffolds or other extension equipment. It consists primarily of longitudinally corrugated roof sheets 60, which as shown in Fig. 16 are secured to roof carlines 61 with gussets 62 normally interposed and the roof is adapted to reinforce the side frames as well as to have considerable resistance to compression. At the region over the doorway 52, an additional plate 63 is used for additional reinforcement of the side frame. The ends of the carlines are connected by a channel 64 similar to channel 44 on the tops of the side frame posts although angular cross section members might be used if desired. Near the end of the roof; and secured to the inside at sub-assembly, is an end reinforcing plate 70 (see Figs. 18 and 19) which is initially welded to the inside of the roof corrugations 60. An angle 71 having a depending flange 7Ia acts as an end carline and is also secured to the roof and inside sheathing is secured to it.

In final assembly of the roof to the side frame, the channels 44 and 64 are brought into back to back relation with the gussets 62 on the roof sub-assembly overlapping and joined in the overlapping region to the side frame. In addition, a gusset 65 on the side frame extends upwardly to overlap the carlines 61 of the roof which have angles 66 to which the gussets are secured as shown in Fig. 17. A secure joint is thus made between the roof and side and in addition, the combined channels become a chord member of considerable strength.

The end frame posts 27 are attached to the roof by inserting a relatively deep channel 75 or short purline between the open post members and welding thereto. The channel 75 is first welded to intermediate flanged members 76 which are conveniently of channel and Z shape to permit ready adjustment for the roof curvature. The flanges of channel or purline 75 being welded to the flanges of intermediate members 76 and then the final welding of the sides of purline 75 to the faces of posts 27, there is a joint capable of transmitting considerable compression into the roof. It is of course to be understood that purline 77 and roof channel 78 also aid in the stress distribution and if desired, the purlines could be increased on the outside to eliminate the interior ones.

The end of the roof is completed by attachment of the end plate 79 shown in Figs. 20 and 21 as being attached to channel 81. Cut outs 80 permit the plate to fit around posts 27 and be secured thereto. The plate 79 through attached channel 81 is attached initially to the edge of the roof and subsequently, arm 31 of the end frame is attached thereto adding to the connection between the respective parts of the end frame. As shown in Fig. 9, the flanged members 76 extend into the car a substantial distance, the purline 75 extending to a position beyond the typical carlines 61.

The completion of the roof attachment to the end frame is conveniently the last step in the structural assembly of the car body. It is then adapted to be moved onto supporting trucks and be completed from a decorative standpoint including the convenient and detachable assembly of side panels, windows, etc., and the attachment of hardware and equipment. The strength of the body is in the skeleton framework. However, in addition, it will be noted that the various structural elements are adapted to mutually brace and reinforce each other and that progressive welding may be practiced by the use of appropriate cross sections, most of which have outwardly projecting flanges for attachment of component members. Minimum material and full efficiency of joint is possible by these welding steps.

Certain novel features of the underframe and its connection to the side walls, the novel side and roof subassemblies per se and their joinder to each other, and the novel structure for transmitting the loading from the offset bearing into the roof and side wall structures are not claimed broadly herein but are so claimed in copending applications Serial No. 139,145, filed April 27, 1937, Serial No. 740,544, filed August 20, 1934, Serial No. 193,870, filed March 4, 1938, a division of Serial No. 720,650, filed April 14, 1934, Serial No. 720,489, filed April 13, 1934 and Serial No. 41,032, filed September 18, 1935.

While preferred forms of embodiment of the invention are shown, it is well known that modifications may be made thereto and a broad interpretation of the invention within the spirit and scope of the disclosure herein and of the claims appended hereinafter is desired.

We claim:

1. A vehicle body of the class described having subassembled wall units including an end frame unit and a roof unit having sheathing and transverse carlines, the end frame having longitudinally deep box section posts on opposite sides of a doorway opening extending to the roof, stress distributing purlines secured to the roof sheathing and carlines and arranged in longitudinal alignment with said posts, the upper ends of the posts having a wide overlap with the purlines through which they are strongly secured thereto, and a closing plate extending across the body and secured to the end frame and the roof.

2. A vehicle body of the class described having subassembled wall units including an end frame unit and a roof unit having sheathing and transverse carlines, the end frame having longitudinally deep box section posts on opposite sides of a doorway opening extending to the roof, stress distributing box section purlines secured to the roof sheathing and car lines, and arranged in longitudinal alignment with said posts, the upper ends of the posts receiving said purlines between their upwardly extended side walls and forming an extensive overlap therewith through which the end frame unit is strongly tied into the roof unit.

3. A vehicle body of the class described consisting of a plurality of sub-assembly units including side frame sub-assemblies and end frame sub-assemblies, the side edge of each side frame having a post and a diagonal secured to the upper end of said post, said end frame sub-assemblies each having a plurality of diagonals extending outwardly to a position intermediate the top and bottom, a gusset anchoring said diagonals, said gusset being finally assembled to the end frame posts intermediate the tops and bottoms thereof.

4. A vehicle body having a plurality of sub-assembly units including a roof sub-assembly unit, and spaced end frame posts, said roof unit including a plurality of transverse carlines, longitudinally corrugated sheathing secured to said carlines, a plate interposed between said sheathing and carlines for some distance inwardly of the roof end and secured thereto, vertically deep purlines secured to the reinforced roof sheathing and carlines and in final assembly to the end frame posts, whereby the stresses on said end posts are distributed into the roof.

5. A vehicle body consisting of a plurality of sub-assembly units including a roof unit, said roof unit including a plurality of transverse carlines, a longitudinally corrugated roof sheathing secured to said carlines and a plurality of longitudinally extending purlines secured to the outside of the carlines and sheathing, and an end plate including a channel section end carline, said end plate and carline being secured to the edge of the roof sheathing and forming a transverse web across the extreme end of the roof.

6. A rail car body having a light weight underframe and side frames forming substantial strength members of a car body, said underframe including an articulated end sill, and an end frame, said end frame being a sub-assembly unit and consisting of relatively deep hollow posts secured to said end sill and extending upward to the roof, and a pair of anti-telescoping channel members secured to said roof in longitudinal alignment with and attached to said posts through overlapping extensions of the sidewalls of the posts, said end frame being secured to said side frame intermediate of the top and bottom of the side frame to carry stress thereinto.

7. A vehicle body of the class described having an articulated end sill projecting outwardly beyond the end of the body, an end frame consisting of a plurality of longitudinally deep vertically extending posts and diagonals extending from points adjacent the top and bottom of the posts to the side frame adjacent the belt line, a side frame having a truss construction including a top chord member, a lower chord member, an end post, intermediate diagonals and posts, and a belt rail, gussets to tie in a diagonal at the top of the end post of the side frame and gussets adapted to tie in the end frame diagonals to the end post of the side frame at the belt rail.

8. A vehicle body of the articulated type having an end sill projecting outwardly beyond the end of the body, an end frame consisting of a plurality of longitudinally deep vertically extending posts and diagonals extending from points adjacent the top and bottom of the posts to the side wall adjacent the belt line, a side frame having a truss construction including a top chord member, a lower chord member, an end post, intermediate diagonals and posts, a belt rail, gussets to tie in a dagonal at the top of the end post of the side frame and gussets adapted to tie in the end frame diagonals to the side frame end post at the belt rail, a compression resisting roof having overlapping portions adapted to engage the top chord of the side frame and having stress distributing members anchored to the longitudinally deep end frame posts, and a transverse end plate serving as a diaphragm anchored to the end frame and to the roof.

9. A car body construction for articulated trains comprising side wall trusses, an end sill member terminating short of the side wall trusses and having a center bearing supporting the car body in eccentric relation to the horizontal transverse axis of the sill, end frame truss structures tying into the ends of said end sill and into the ends of the side wall trusses, said end frame trusses including diagonal compression members carrying a portion of the loading on the end sill directly into said side frame structures, and a member adapted primarily to take tension stresses interconnecting the outer top corner of the end frame trusses and the side wall trusses.

10. A car body construction for articulated trains comprising side wall trusses, an end sill member terminating short of the side wall trusses and having a center bearing supporting the car body in eccentric relation to the axis of the sill, car end truss structures tying into the ends of said end sill and into the ends of the side wall trusses, said car end trusses including diagonal compression members carrying a portion of the loading on the end sill directly into said side wall trusses, a member adapted primarily to take tension stresses interconnecting the outer top corners of the end frame trusses and the side wall trusses, a reinforced transverse needle beam arranged below the floor level and some distance inwardly of the end of the car having its ends connecting into the side frame trusses, an inward extension on said end sill member, a center sill telescoped over said inward extension and secured thereto, said center sill being strongly connected to said needle beam whereby the moment of an eccentric loading on the end sill and buffer shocks thereon are transmitted into the side frame trusses by vertical forces at the needle beam and the end truss.

11. An end frame anti-collision post including a principal Z member, a secondary Z member having one of its flanges welded to a flange of the principal Z member, a filler channel of a width equal to extending parts of the end frame, and a closing channel, one flange of the closing channel being secured to the second flange of the principal Z member, with adjacent flanges of the channel members welded together and the remaining flange of the filler channel welded to the second flange of the secondary Z member, said post being hollow and adapted to telescope over projections on an end sill.

12. An end frame anti-collision post including a principal Z member, a secondary Z member having one of its flanges welded to a flange of the principal Z member, a filler channel of a width equal to extending parts of the end frame, and a closing channel, one flange of the closing channel being secured to the second flange of the principal Z member, with adjacent flanges of the channel members welded together and the remaining flange of the filler channel welded to the second flange of the secondary Z member, said post being hollow and adapted to telescope over projections on an end sill, the upper portion of the post having open spaced faces to which a roof purline may be secured.

13. A vehicle body of the class described comprising a side frame sub-assembly, an end frame sub-assembly, and a roof sub-assembly, and means to join said sub-assemblies including a plate and an angular member secured thereto, said angular member being secured to the extreme end of the roof, and to the end frame, said plate maintaining the curvature of the roof, and supplementary means on the roof extending to the end frame for transmission of compression stresses into said roof, said roof having extension members overlapping parts of the side frame and secured thereto in the overlapping portion, said end frame being attached to the side frame intermediate the top and bottom thereof.

14. An end frame sub-assembly for a vehicle body having a pair of spaced vertical posts located on opposite sides of a doorway opening, diagonals each extending upwardly and outwardly from a connection adjacent the base of one of the posts to the adjacent side wall of the body, other diagonals each extending from a connection adjacent the top of one of the posts to a point adjacent the outer end of one of the first named diagonals, gussets joining the outer ends of said diagonals and forming final assembly joints for securement of the end frame sub-assembly to the side walls.

15. An end frame sub-assembly for a vehicle body having a pair of spaced vertical posts located on opposite sides of a doorway opening, diagonals joined adjacent the top and bottom of each of said posts and converging outwardly toward the side walls, respectively, gussets joining said converged ends and forming final assembly joints with side wall units and a member adapted to take tension loads extending from side to side wall through the upper regions of the posts and provided at its ends with final assembly joints structures for securement to the tops of the side wall units.

16. An end frame sub-assembly for a vehicle body having a pair of spaced vertical posts located on opposite sides of a doorway opening, pairs of diagonals extending, one diagonal of each pair from adjacent the bottom and the other diagonal of each pair from adjacent the top of each of said posts laterally, the diagonals of a pair converging at the side walls and being secured together at their converging ends by final assembly joint gussets arranged to be joined in final assembly to the ends of the side walls, a tension member associated with each pair of diagonals tying their converging ends to the adjacent vertical post, and a transverse tension member adjacent the tops of the posts having its ends formed to provide final assembly joints with the side wall.

ALBERT G. DEAN.
WILLIAM W. FARR.